(12) United States Patent
Fleytman

(10) Patent No.: US 6,523,430 B1
(45) Date of Patent: Feb. 25, 2003

(54) POWER TAKE-OFF UNIT WITH GEARSET

(75) Inventor: Yakov Fleytman, Orion, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/687,134

(22) Filed: Oct. 13, 2000

Related U.S. Application Data

(60) Provisional application No. 60/159,889, filed on Oct. 15, 1999.

(51) Int. Cl.[7] ............................................. B60K 17/34
(52) U.S. Cl. ...................... 74/425; 74/665 T; 180/233
(58) Field of Search ............................. 74/425, 665 T, 74/665 A; 180/233, 246, 247

(56) References Cited

U.S. PATENT DOCUMENTS

| | | | | |
|---|---|---|---|---|
| 1,903,318 A | * | 4/1933 | Wildhaber | .................. 74/425 |
| 3,220,284 A | | 11/1965 | Horvath | |
| 4,907,672 A | * | 3/1990 | Muzzarelli | .................. 180/233 |
| 4,973,295 A | | 11/1990 | Lee | |
| 5,015,898 A | | 5/1991 | Frey | |
| 5,033,996 A | | 7/1991 | Frey | |
| 5,988,006 A | | 11/1999 | Fleytman | |
| 5,992,259 A | | 11/1999 | Fleytman | |
| 6,074,322 A | | 6/2000 | Fleytman | |
| 6,093,126 A | | 7/2000 | Fleytman | |
| 6,098,480 A | | 8/2000 | Fleytman | |
| 6,148,683 A | | 11/2000 | Fleytman | |

FOREIGN PATENT DOCUMENTS

| | | | |
|---|---|---|---|
| DE | 34 35 219 | * | 5/1985 |
| DE | 34 38 856 | * | 9/1985 |

* cited by examiner

*Primary Examiner*—William C Joyce
(74) *Attorney, Agent, or Firm*—Harness, Dickey & Pierce P.L.C.

(57) ABSTRACT

A power take-off unit for a transaxle is provided with a unique double enveloping worm/worm gear transmission which has a ratio of the number of gear teeth on the worm gear to the number of threads on the worm which is low. The worm/worm gear transmission is more compact than conventional bevel gear systems which have typically been used in power take-off unit applications. The worm and worm gear transmission of the present invention also is quieter in operation and has a higher torque capacity than standard bevel gears of comparable size.

1 Claim, 14 Drawing Sheets

POWER TAKE-OFF UNIT WITH GEARSET

This application claims the benefit of provisional application Serial No. 60/159,889 filed on Oct. 15, 1999.

FIELD OF THE INVENTION

The present invention relates generally to vehicle powertrains, and more particularly to a power take-off unit for a transaxle equipped with a unique worm/worm gear transmission.

BACKGROUND OF THE INVENTION

Many four-wheel drive vehicles are equipped with a transfer unit which distributes motive power from the powertrain to the front and rear axles in order to drive all of the wheels. For example, in front-wheel drive vehicles, a power take-off unit (PTU) is used to transfer power from the transaxle to the rear driveline. One known type of PTU includes a transfer shaft driven by the transaxle and an intermediate shaft which is driven by the transfer shaft. Typically, the intermediate shaft is provided with a bevel gear which meshingly engages a second bevel gear mounted on the PTU output shaft which drives the rear driveline. A problem with current bevel-type transfer units is that the bevel gears are large and can generate undesirable noise.

Accordingly, it is desirable in the art of vehicle powertrains to provide an alternative to current transfer units which are smaller and quieter than current designs.

Worm gearsets, otherwise referred to as worm/worm gear transmissions, are known in the mechanical power transmission field. The worm gear is driven by the rotation of the worm with which it meshes. The rotational speed of the associated shaft of the worm gear is a function of the number of teeth on the worm gear and the number of threads on the worm. The worm may be single or multiple threaded. Conventional worm/worm gear transmissions have a worm gear with at least 24 teeth. In particular, the American National Standard "Design of Industrial Double-Enveloping Wormgears" (ANSI/AGMA-6030-C87) recommends 24 as the minimum number of gear teeth. Furthermore, the enveloping angle of known worm gears for one revolution of the thread of the worm is not more than 15 degrees. Moreover, standard double enveloping worm/worm gear transmissions have been used only for ratios of five and more. Due to such high ratios, it has been considered impractical to use the worm gear as the driven member and the worm as the driving member to transfer power from the worm gear to the worm.

SUMMARY OF THE INVENTION

It is an object of the present invention to provide a power take-off unit (PTU) for a transaxle which is quieter and more compact than prior designs. These and other objects of the present invention are obtained by providing a power take-off unit with a worm gearset including a transfer shaft rotatably driven by a carrier of a front differential assembly. The transfer shaft drives a transfer gear which is meshed with an intermediate gear mounted on an intermediate shaft. The intermediate shaft also includes one of a worm or worm gear which matingly engages the other of a worm and worm gearset which is mounted to a power take-off unit output shaft. The worm gearset is a double enveloping worm/worm gear transmission which has a very low ratio between the number of gear teeth on the worm gear and the number of threads on the worm. Preferably, the number of worm gear teeth is less than twenty-four.

Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmissions of the present invention utilize a worm gear without undercut gear teeth because of a greater enveloping angle for one revolution of the worm thread.

With less than twenty-four gear teeth and a greater enveloping angle for one revolution of the thread, as compared to prior enveloping worm/worm gear transmissions, the minimum ratio for one thread could be reduced to two, with an increased efficiency. In contrast, prior enveloping worm/worm gear transmissions had a minimum ratio of twenty-four for one thread of the worm and a ratio of five for five threads of the worm. The efficiency of the new worm/worm gear transmission is even greater than that of well-known hypoid gearsets which are used in low ratio right angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 24:
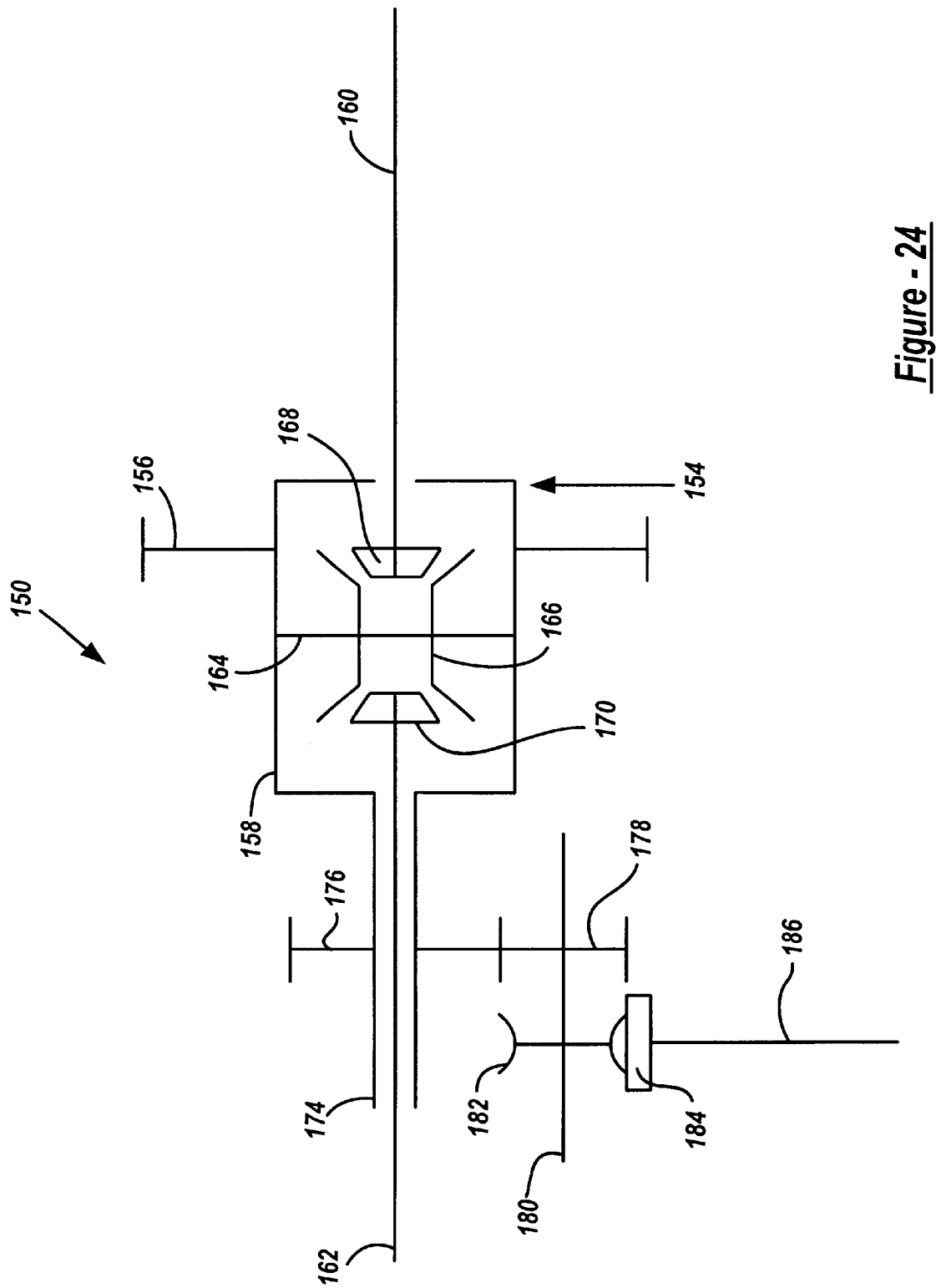
FIG. 24 is a sectional view of a power take-off unit for a transaxle which is provided with a worm/worm gear transmission according to the principles of the present invention.
Figure 25:
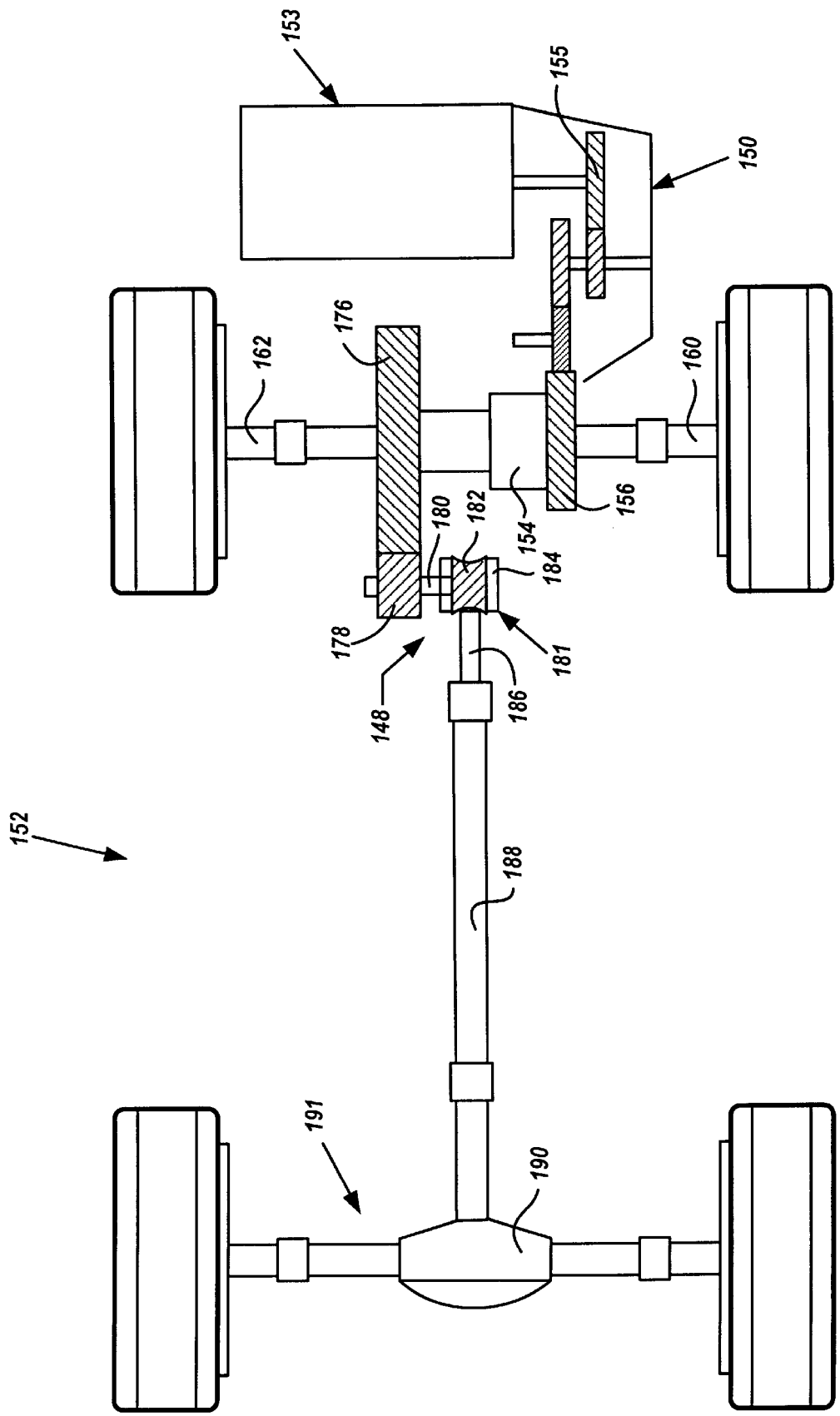
FIG. 25 is a schematic view of a vehicle powertrain incorporating the power take-off unit according to the principles of the present invention.

A power take-off unit for a transaxle with a worm gearset according to the principles of the present invention will be described below with reference to FIGS. 24 and 25. However, the following discussion relating to FIGS. 1–23 provides a detailed description of the unique enveloping-type worm/worm gear transmissions which can be utilized with the present invention.

The reason for using an enveloping-type of worm gear is that this type of worm gear has a natural profile of tooth surface which is distinct from other types of thread followers. The configuration of the worm gear teeth is generated by the profile of the thread or threads of the worm. A computer model simulation can be utilized to generate the configuration of the worm gear teeth of the worm gear. The worm gears can then be formed using known techniques such as hobbing or casting. When the worm gear teeth are generated by the profile of the threads of the worm having different lengths for the same enveloping angle (shortened), the profiles of the worm teeth is different. The main advantage for using the enveloping-type of worm gears is more torque capacity. For better torque capacity, the enveloping-type of worm gear could have a different enveloping angle.

The worm thread has a rolling action contact relationship with the teeth of the worm gear which provides an increased efficiency. Furthermore, it is beneficial to have the pitch diameter in the center portion of the worm on the same order as the pitch diameter in the center of the worm gear. With standard worm designs, with more than one thread and a large enveloping angle, the inability to assemble the worm and worm gear was considered a major obstacle. With the worm and worm gear of the present invention, the worm and worm gear are easily assembled by properly orienting the worm thread and worm teeth.

According to the present invention, the greater enveloping angle for one revolution of the worm thread permits the use of worm gear teeth without undercut portions.

In one feature of the present invention, a worm and worm gear combination are utilized to transmit rotation with the smallest ratio between the worm gear teeth and one worm thread. In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only 2 but is preferable larger than 15 degrees.

Figure 1:
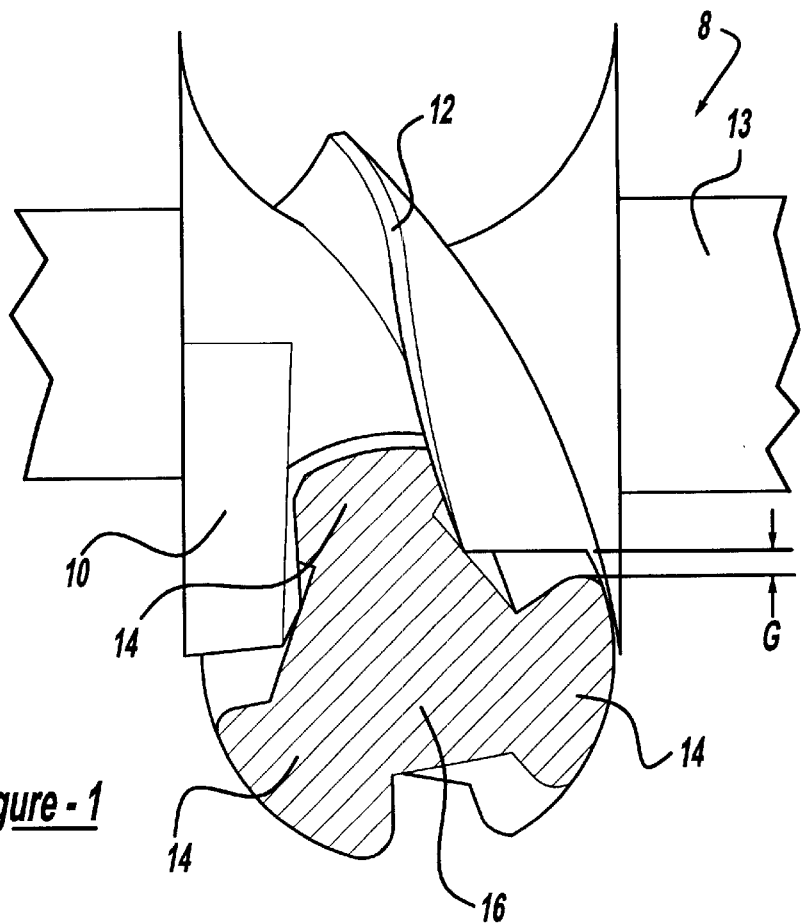
FIG. 1 is a sectional view of a worm/worm gear transmission with the worm gear having three teeth according to the principles of the present invention.

Referring now to the drawings, one embodiment of a worm/worm gear transmission 8 of the present invention is illustrated in FIG. 1. Transmission 8 has an enveloping type worm 10 with at least one screw thread 12. Enveloping type worm 10 is supported on a shaft 13. Thread 12 is engaged by at least one tooth 14 of an enveloping type worm gear 16, which is shown to have three teeth 14. As shown in FIG. 1, enveloping worm 10 has a single thread 12 in a preferred embodiment and worm gear 16 has three teeth 14 spaced about its circumference. As shown, a gap "G" exists between any tooth on worm gear 16 and thread 12 on enveloping worm 10. Enveloping worm 10 wraps around enveloping worm gear 16, and enveloping worm gear 16 also wraps around enveloping worm 10.

Worm gear 16 and worm 10 are preferably enclosed in a housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown).

Figure 17:
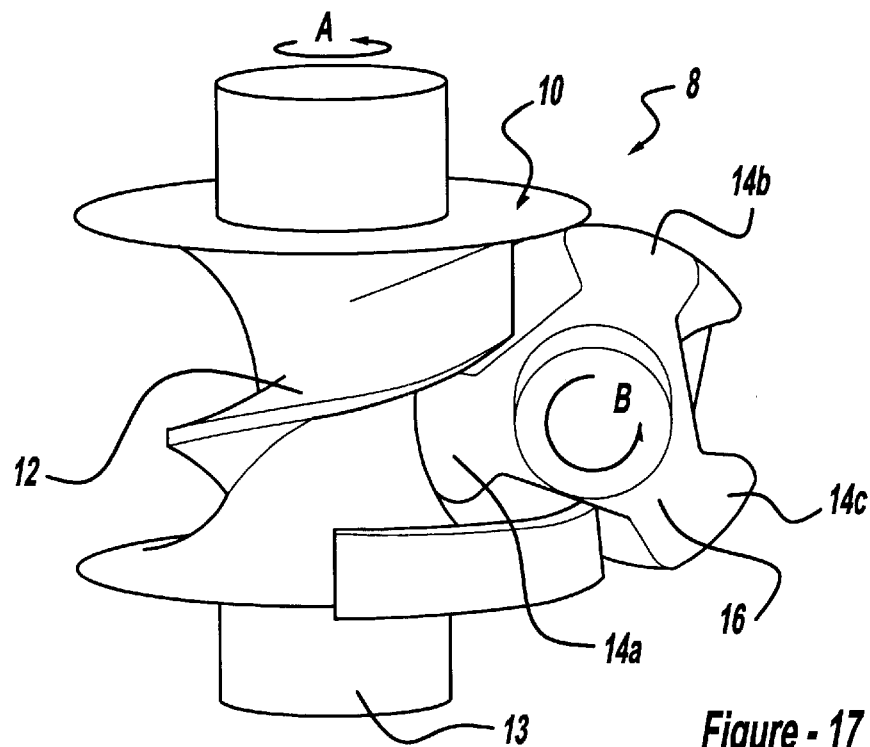
FIG. 17 is a perspective view of the worm/worm gear transmission shown in FIG. 1 with three worm gear teeth.

FIG. 17 is a perspective view corresponding with worm/worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 14a presses downward on tooth 14a to cause rotation of worm gear 16 in the direction of Arrow "B". As worm gear 16 rotates, gear tooth 14b then comes into engagement with thread 12 and is acted on to cause further rotation of worm gear 16 as gear tooth 14a disengages from thread 12.

Figure 2:
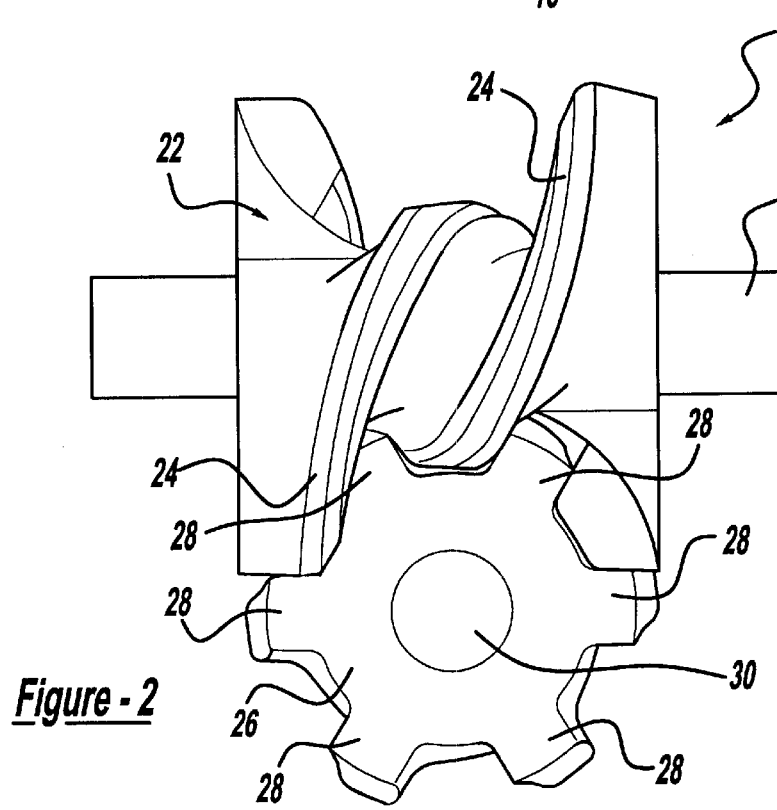
FIGS. 2 and 3 are views of a worm/worm gear transmission with the worm gear having six teeth according to the principles of the present invention.
Figure 3:
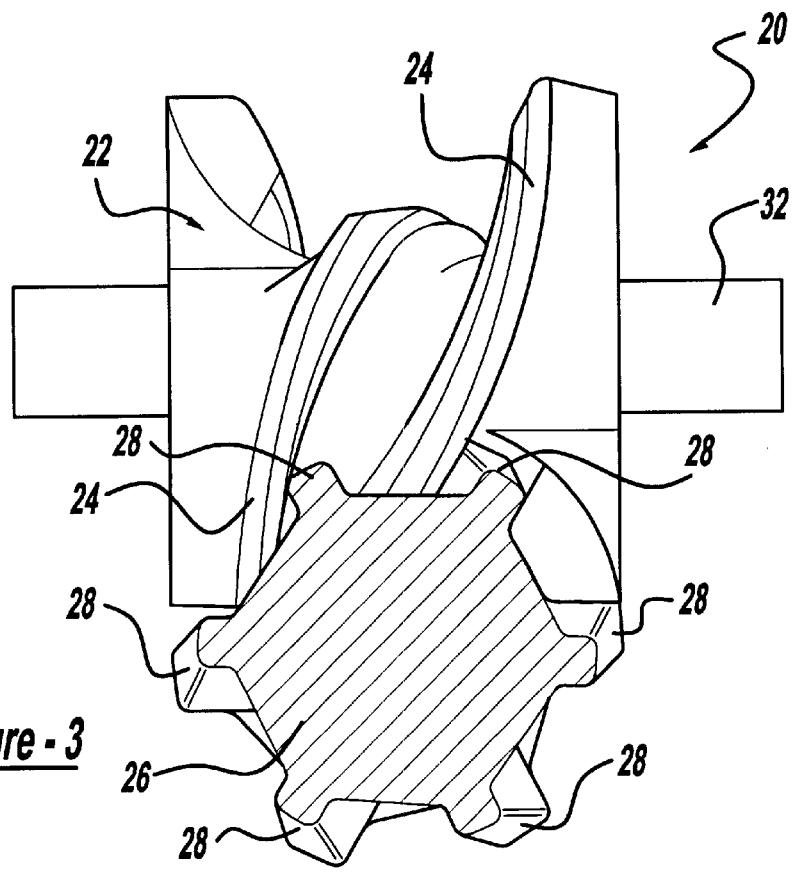
Figure 4:
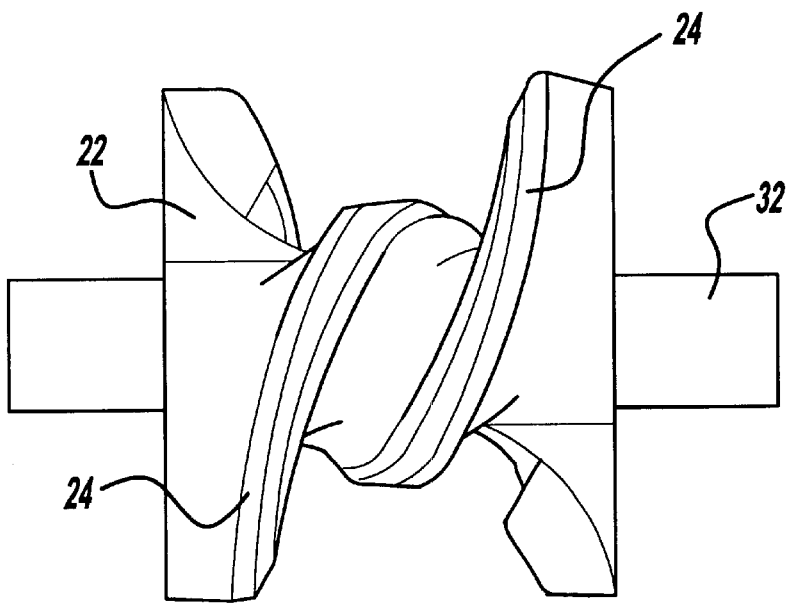
FIG. 4 is a side view of an enveloping worm having two threads.
Figure 18:
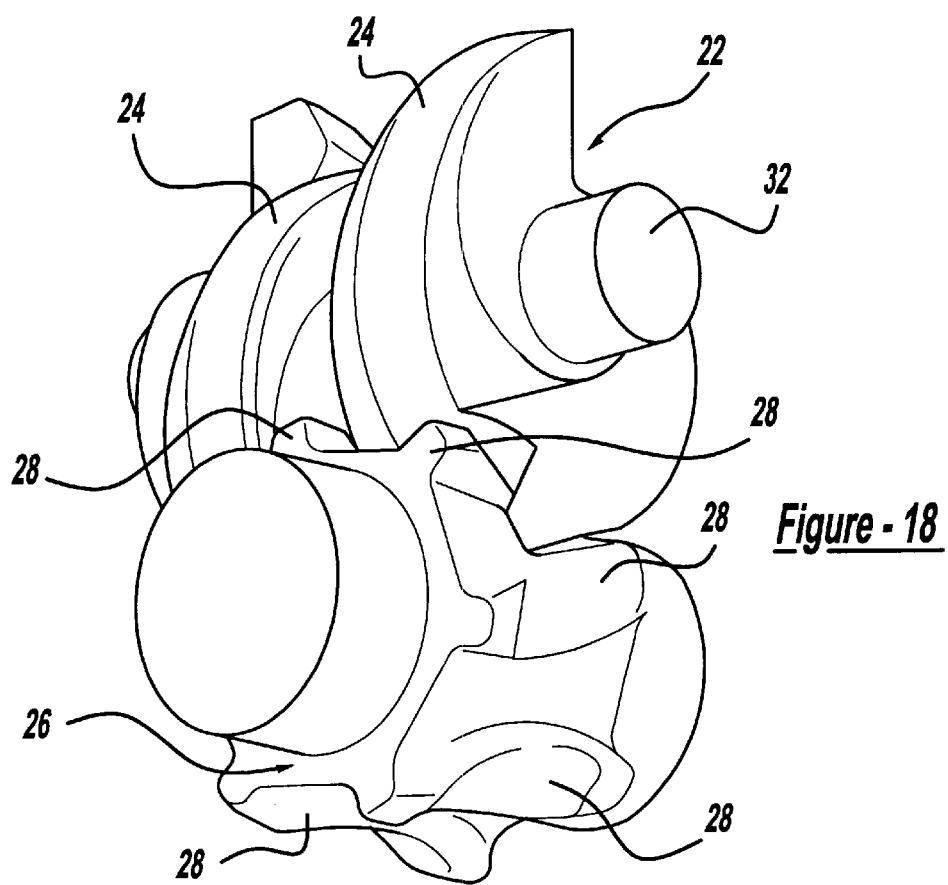
FIG. 18 is a perspective view of the worm/worm gear transmission shown in FIG. 2 with six worm gear teeth and two threads on the worm.

Another embodiment of a worm/worm gear transmission 20 of the present invention is illustrated in FIG. 2. This transmission has an enveloping-type worm 22 with two identical screw threads 24. Threads 24 are engaged by at least one tooth of an enveloping-type worm gear 26 shown to have six teeth 28. Worm gear 26 is connected to a shaft 30 while worm 22 is connected to a shaft 32. In FIG. 3, worm gear 26 is shown in cross-section. FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
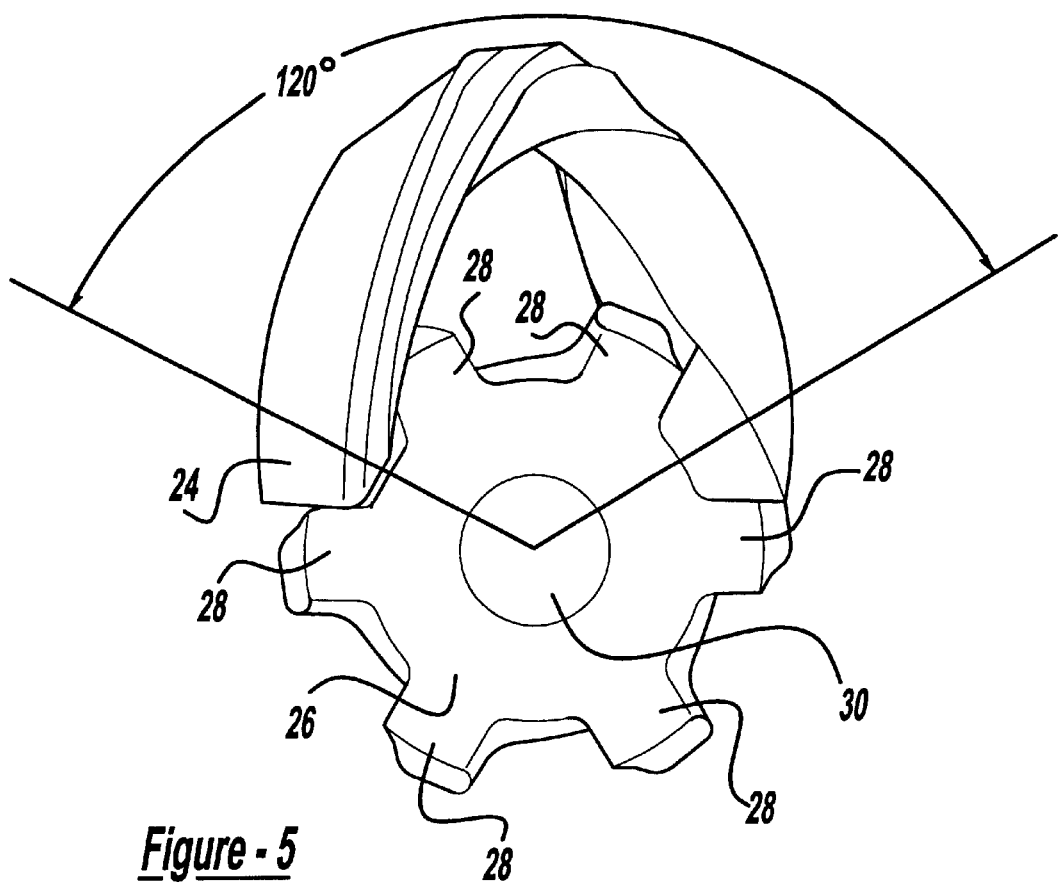
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360 around the axis of rotation for shaft 32.

Figure 21:
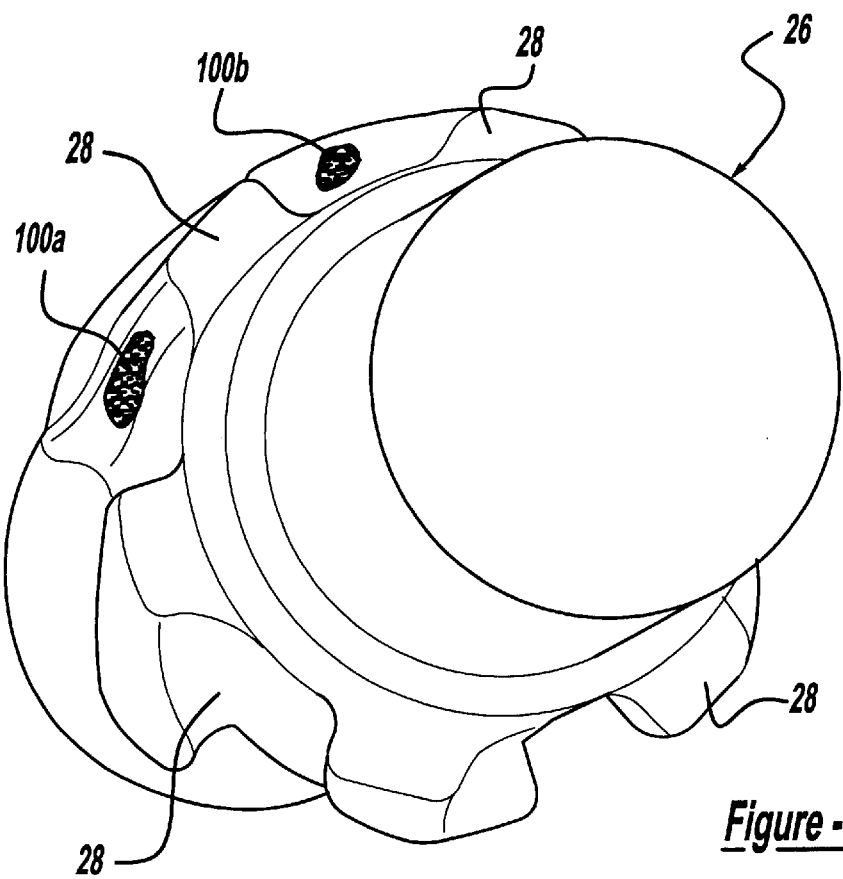
FIG. 21 is a perspective view of a worm gear with six teeth with darkened spots illustrated on the surface of the teeth to indicate the contact surface with the worm in mesh.
Figure 22:
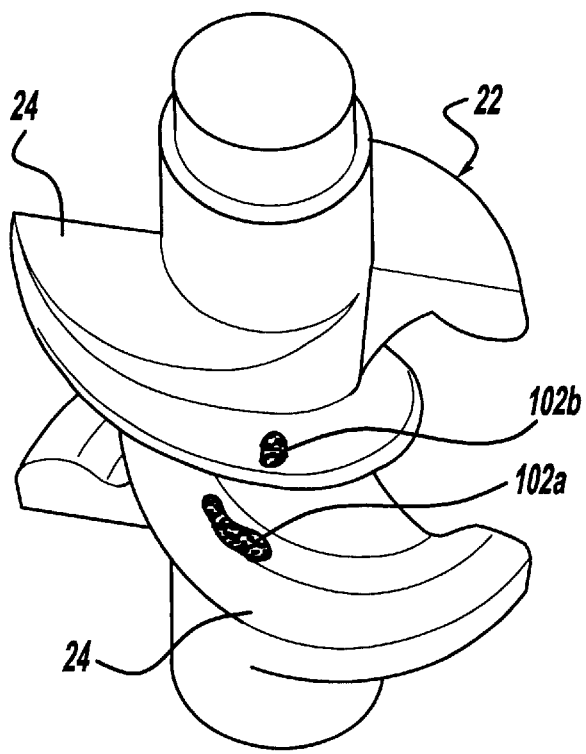
FIG. 22 is a perspective view of a worm with two threads with darkened spots illustrated on the surface of the thread to indicate the contact surface with the worm gear in mesh.

The enveloping worm/worm gear transmissions of the present invention provide for a worm gear having fewer than twenty-four teeth and also provides surface contact between the thread of the worm and the teeth of the worm gear as illustrated in FIGS. 21 and 22. FIG. 21 illustrates two surface contact spots 100a, 100b for a worm gear 26 having six teeth 28. FIG. 22 illustrates two corresponding surface contact spots 102a, 102b for a worm 22 with two threads 24.

Figure 6:
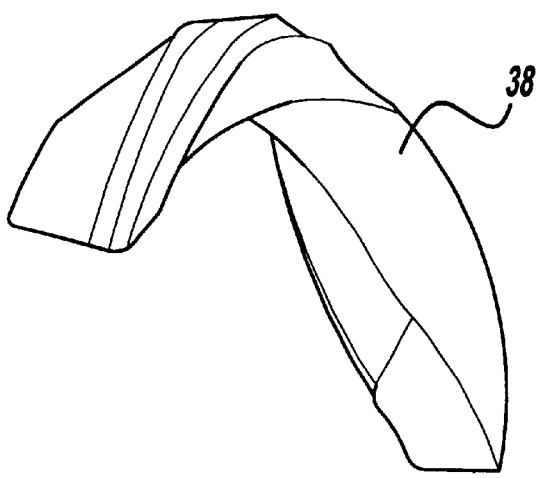
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
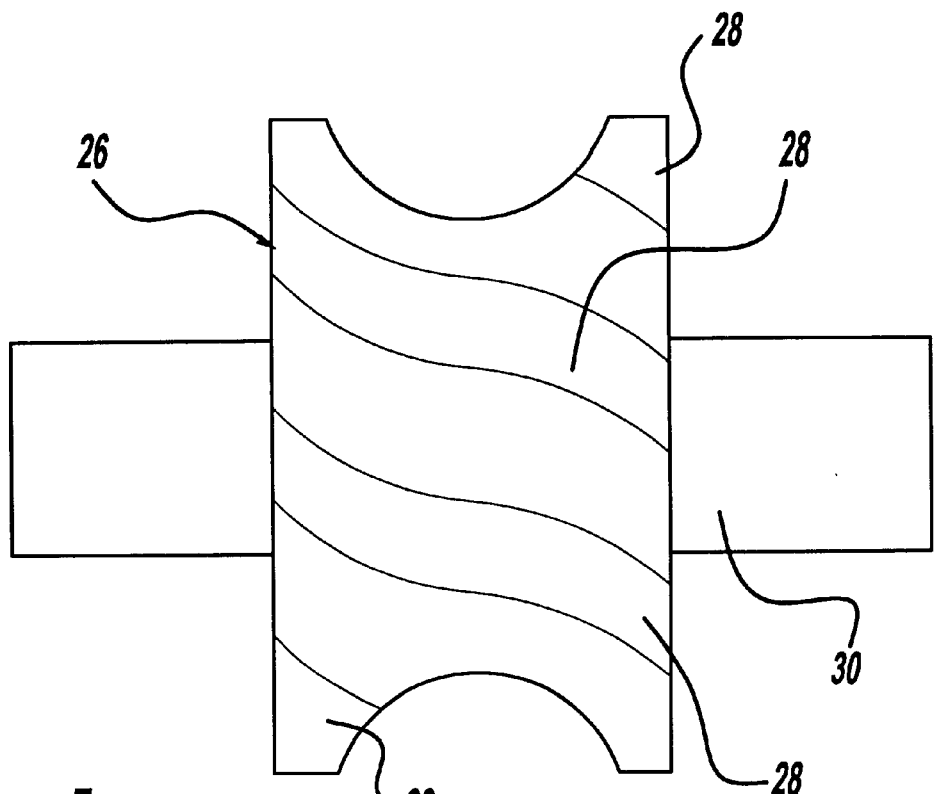
FIG. 7 shows an enveloping worm gear according to the principles of the present invention.
Figure 8:
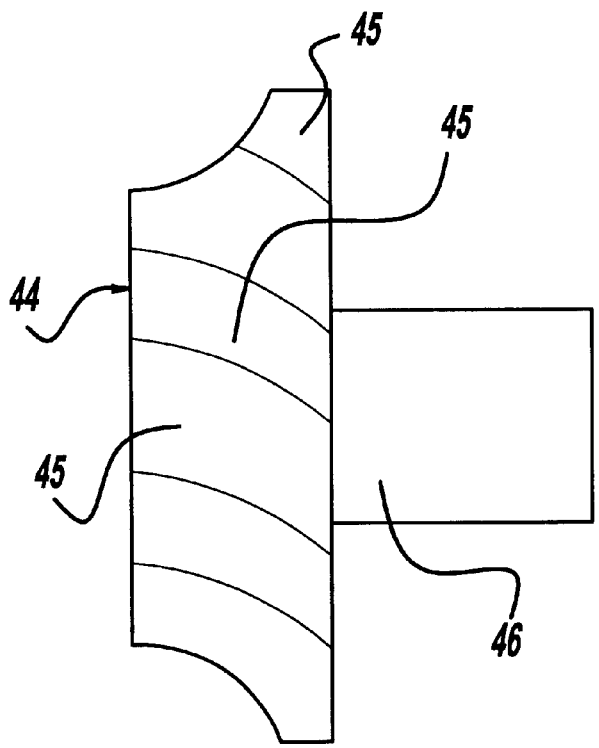
FIG. 8 shows a modified enveloping worm gear.

FIG. 7 shows a side view of enveloping worm gear 26 with six teeth 28. FIG. 8 shows an enveloping worm gear 44 having six teeth 34 which is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm or worm gear allows for disassembling the entire worm gear-collars-shaft assembly.

In the present invention, it is preferred that the ratio of the number of teeth 14 on worm gear 16 relative to the number of threads 12 on worm 10 is 11 to 1 and less. Most preferably, the ratio is three or even less, as shown. It is possible that only two teeth 14 need to be utilized on worm gear 16. The worm/worm gear transmission used in the present application could also self lock. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
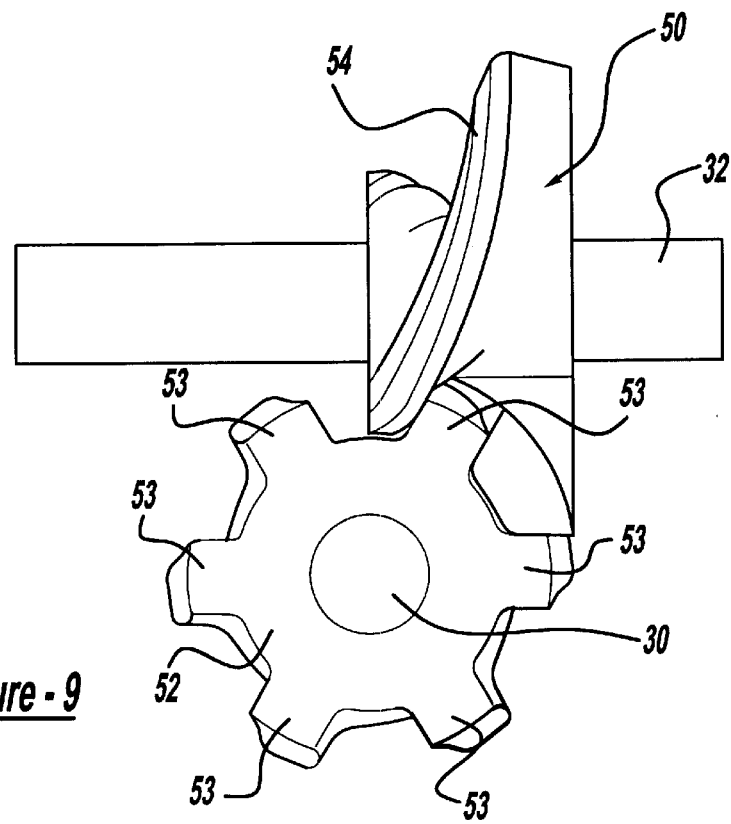
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
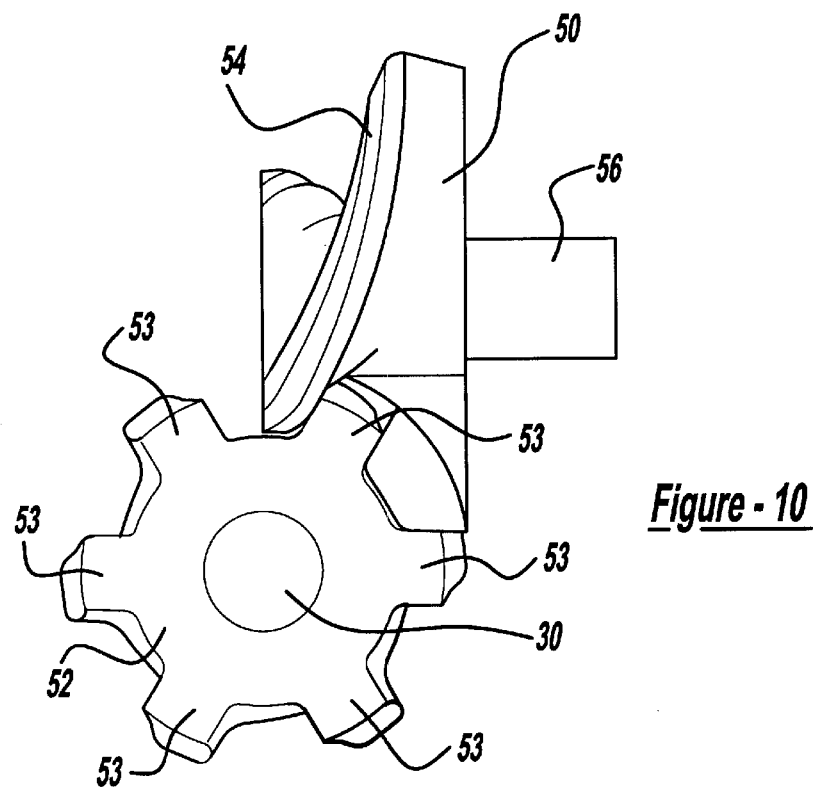
Figure 11:
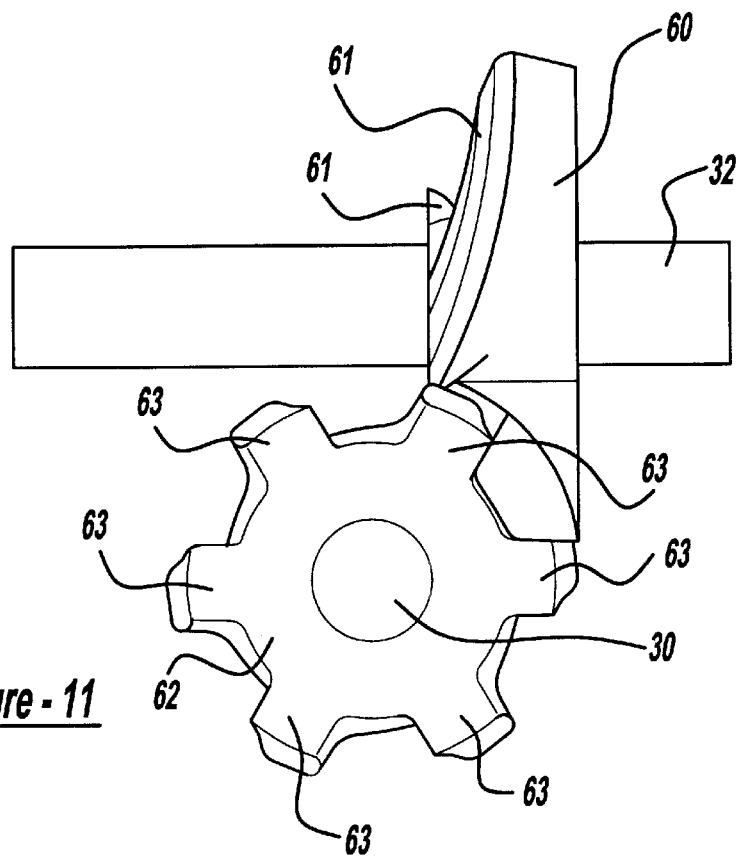
FIG. 11 shows a worm/worm gear transmission with a modified worm in an off-center position.
Figure 12:
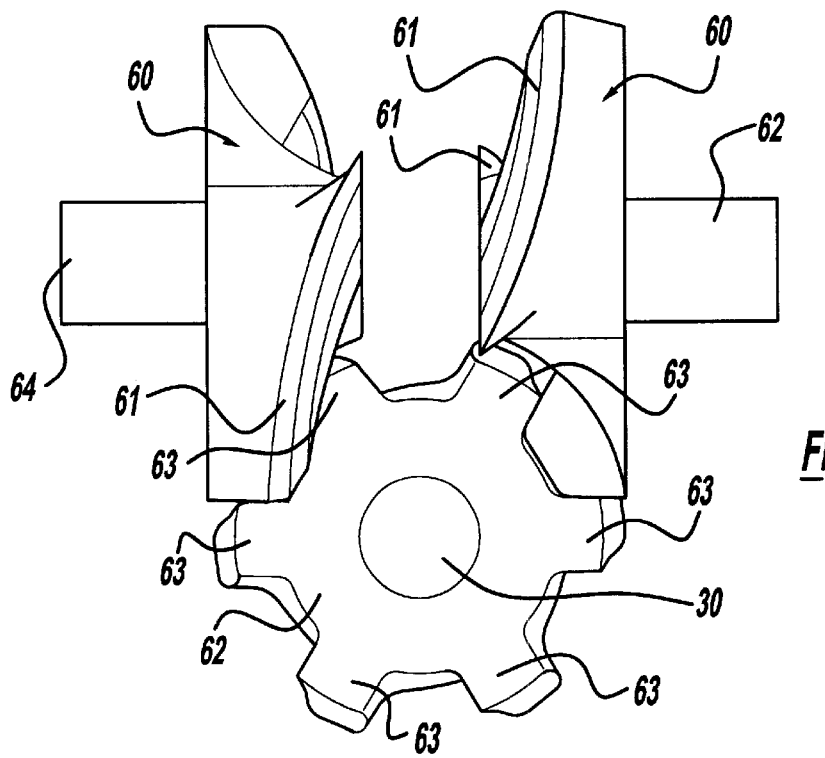
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

Figure 13:
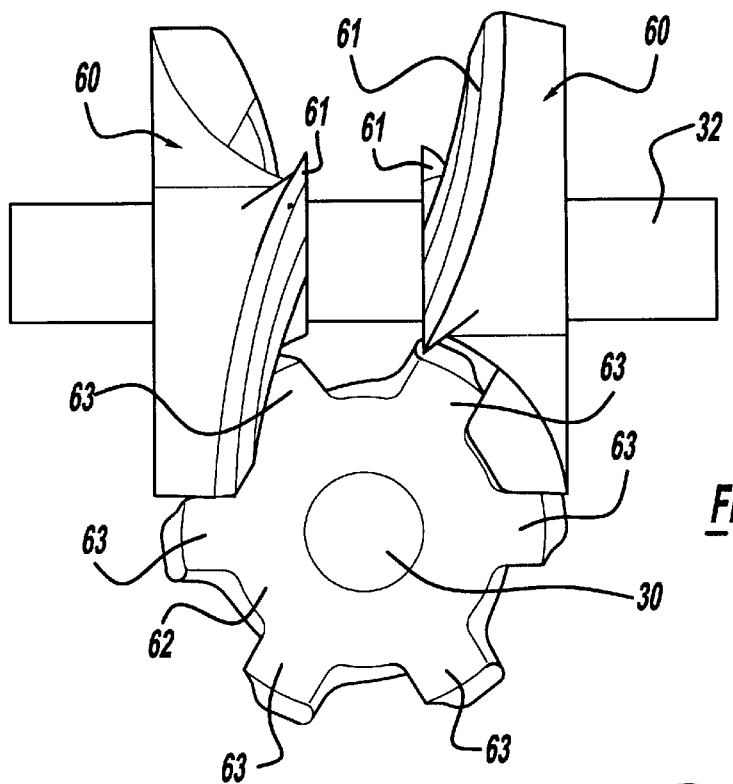
FIG. 13 shows a worm/worm gear transmission with two modified worms aligned on the same axis of rotation and connected to a common shaft.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

Figure 14:
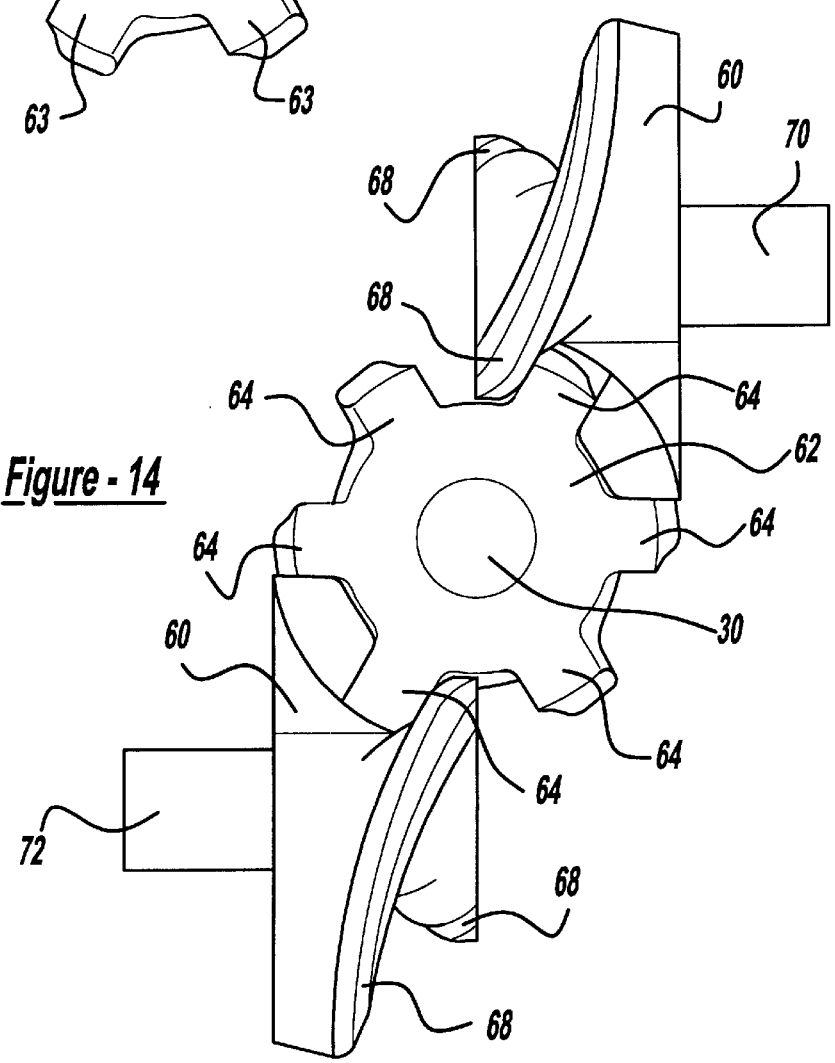
FIG. 14 shows a worm/worm gear transmission with two modified worms located on different axes of rotation.

FIG. 14 shows a view of a worm/worm gear transmission with two modified worms 60 having worm threads 68 each placed on different axes of rotation and connected to different drive shafts 70 and 72. Each of worms 60 meshingly engages the worm gear 62 having teeth 64.

Figure 15:
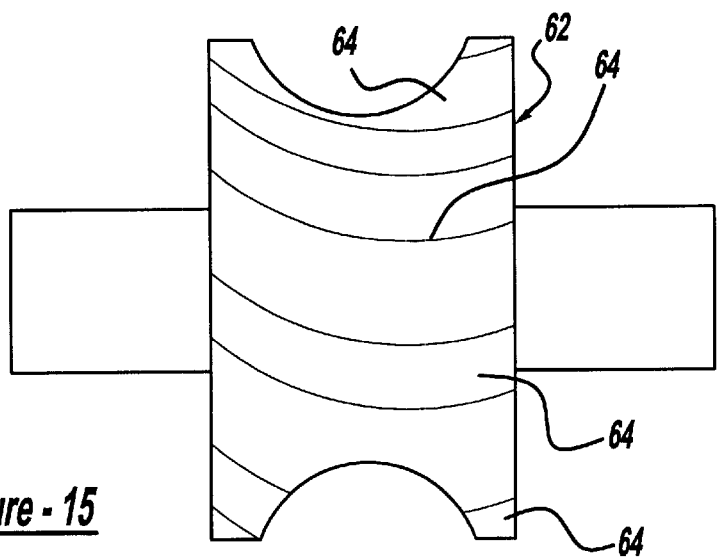
FIG. 15 shows an enveloping worm gear with a different tooth profile.

FIG. 15 shows a side view of an enveloping worm gear 62 with teeth 64 have a different profile which is generated by enveloping thread 68 of worm 60 as shown in FIG. 14.

Figure 16:
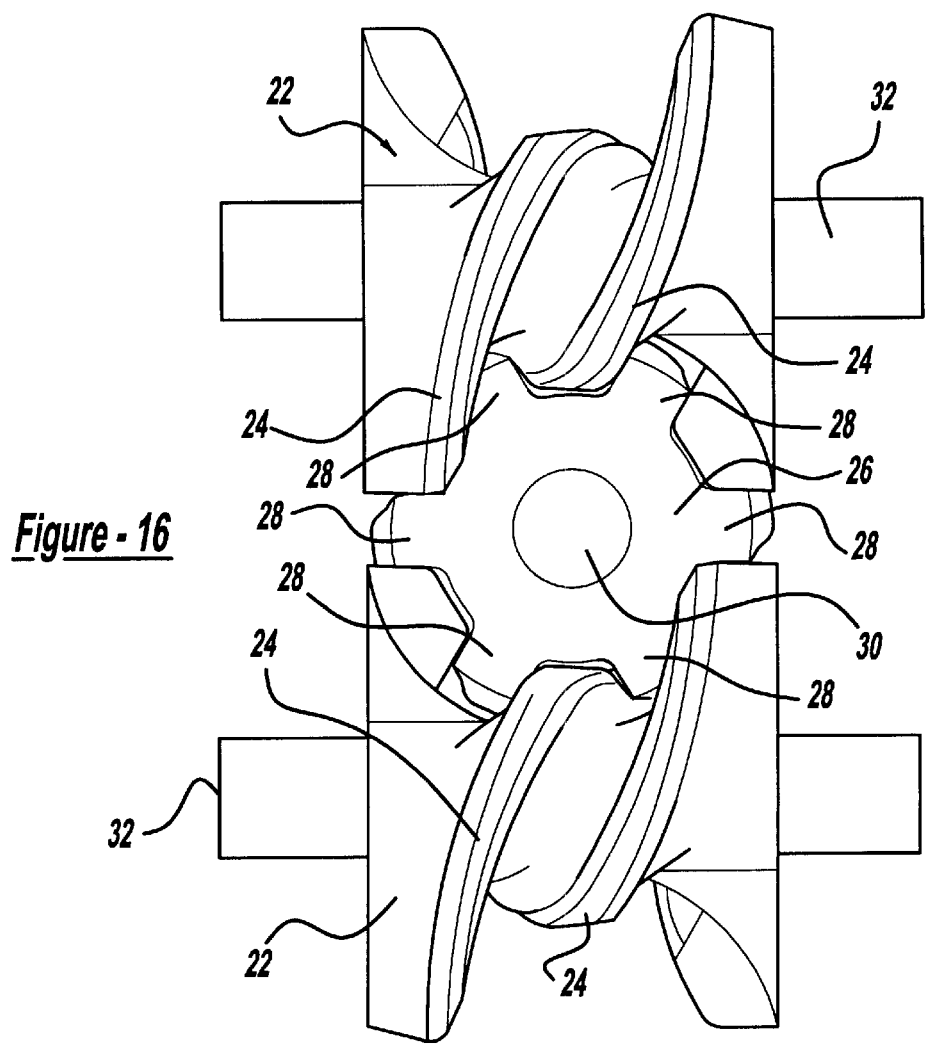
FIG. 16 shows a worm/worm gear transmission with two enveloping worms placed on different axes of rotation.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26.

Figure 19:
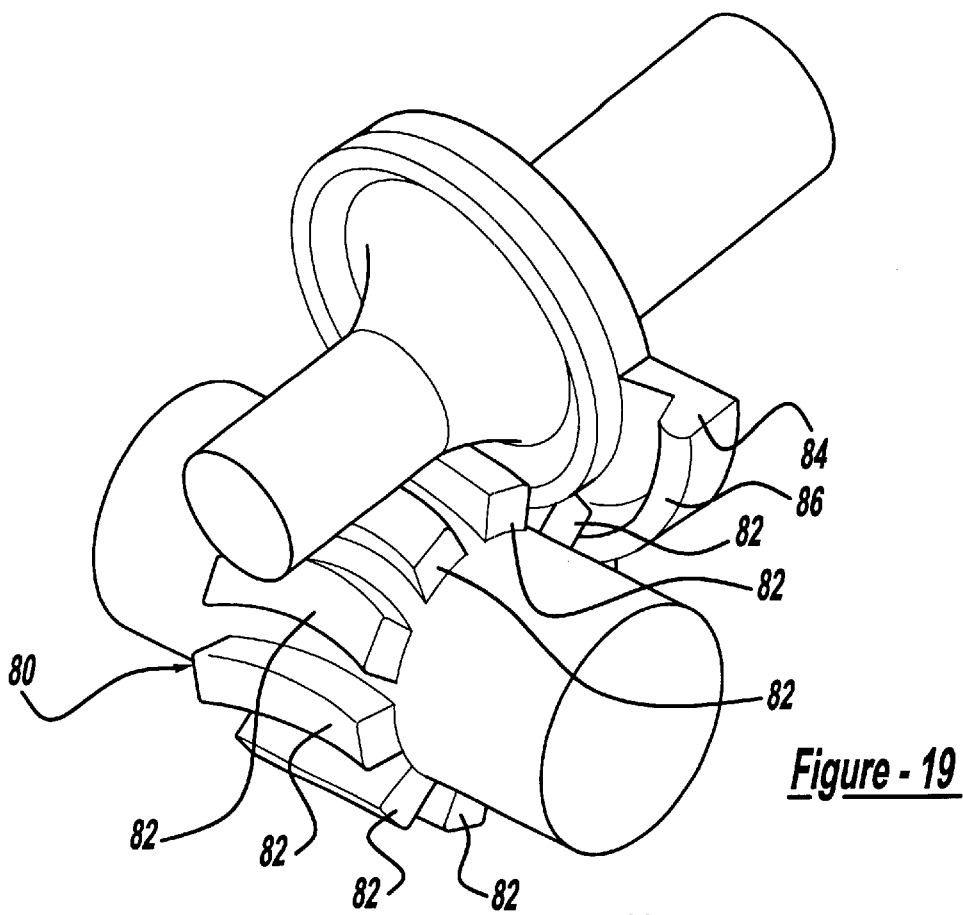
FIG. 19 is a perspective view of a worm/worm gear transmission with ten worm gear teeth and with a single thread worm.

FIG. 19 is a perspective view of a worm/worm gear transmission including worm gear 80 having ten teeth 82 in mesh with an enveloping split worm 84 including a thread 86.

Figure 20:
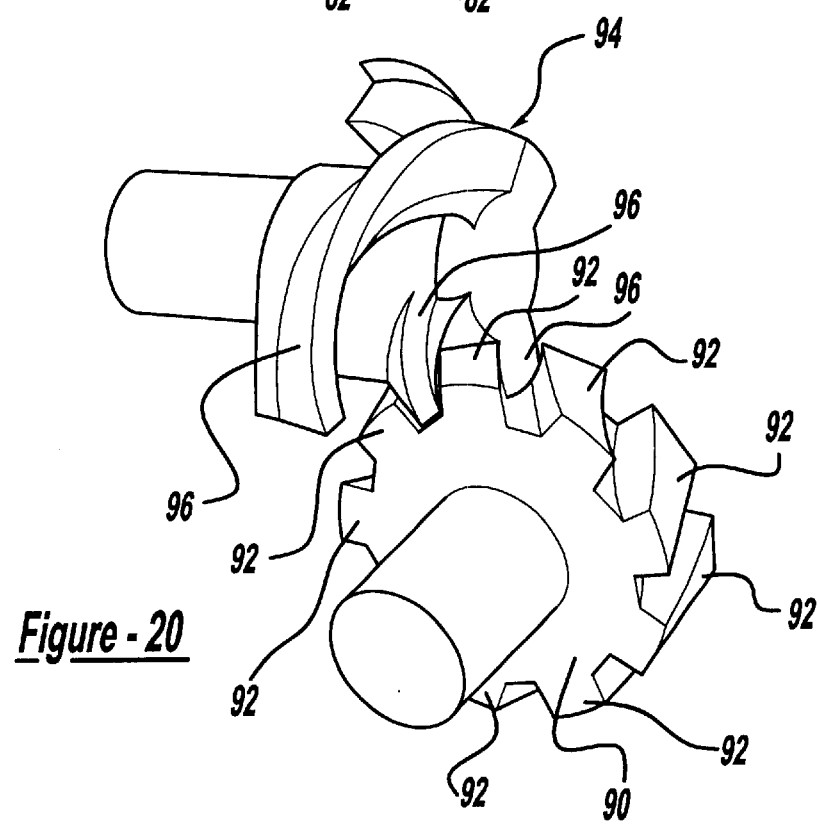
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

Figure 23:
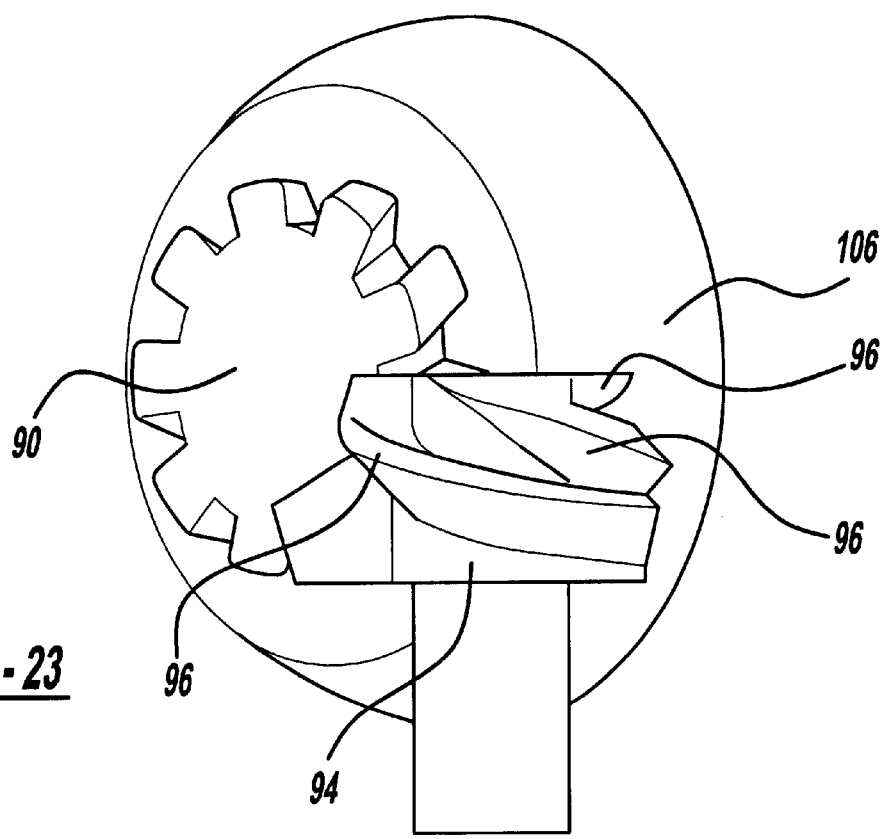
FIG. 23 illustrates the size difference of the worm/worm gear transmission of FIG. 20 in comparison to the size of a typical hypoid gear.

FIG. 23 illustrates the size difference of a worm/worm gear transmission as shown in FIG. 20 in comparison with the size of a typical hypoid gear 106.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown.

Alternatively, when the worm/worm gear transmission does include the self-lock feature, rotary motion can be provided only from the drive shaft to the enveloping worm and through the enveloping type worm gear to the output shaft. Thus, the worm/worm gear transmissions shown in FIGS. 12, 14 and 16, with independent drive shafts connected to the worms, could be used in a split-power transmission to transmit energy from a high-speed engine to a rotor drive shaft. In some powertrain designs, the worm/worm gear transmission of the present invention could replace bevel gears.

In the present invention, a self-locking worm/worm gear combination can have a worm gear to worm thread ratio that is preferably 10 and less. Such a system is desirable so that each one of the worm and worm gear combinations described above can transmit very high torque loads when compared to prior systems.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

In the present application, it is surface-to-surface contact between the worm gear teeth and the worm thread that increases the torque capacity of the enveloping worm/worm gear transmission. This became possible when the enveloping angle of the worm thread for generation of the worm gear teeth is more than 15 degrees, or even 30 degrees. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gearset.

It was confirmed by testing of a steel worm/worm gear transmission constructed according to the present invention that such transmissions can replace hypoid or bevel gearing in many applications. The lower noise of the worm/worm gear transmission compared with hypoid and bevel gear transmissions make using the worm/worm gear transmission of the present invention more beneficial, in particular, in helicopter or in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission. Assuming the modified worm 94 is the same size as the pinion of a hypoid gearset, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications.

The basic inventive system of the present invention can be reconfigured into many different mechanical transmissions. For example, it can be used in a front axle drive and differential drive rear axle of a car, power windows, escalator drive and more.

The double enveloping worm and worm gear transmissions described above can be utilized in a power take-off unit 148 for use with a four-wheel drive transaxle 150, as shown and described with reference to FIGS. 24 and 25. The all-wheel drive powertrain system 152 shown in FIG. 25 is provided with an engine 153 and transaxle 150 which provide power from a geartrain 155 to a front differential 154 via an input gear 156 which is mounted to a carrier 158 (best shown in FIG. 24) of front differential 154. Front differential 154 provides driving torque to front right and left drive axle shafts 160 and 162, respectively.

Front differential 154 includes a pinion pin 164 which is supported by carrier 158. Pinion pin 164 supports a plurality of pinion gears 166 which are meshingly engaged with a first side gear 168 attached to right axle shaft 160 and a second side gear 170 attached to left axle shaft 162 PTU 148 includes a transfer shaft 174 rotatably mounted on left front axle shaft 162 and in splined engagement with carrier 158. A transfer gear 176 is rigidly mounted on transfer shaft 174 and is meshed with an intermediate gear 178 which is rigidly mounted on an intermediate shaft 180. PTU 148 also includes a worm gearset 181 embodying many of the features previously described. Worm gearset 181 includes an enveloping worm gear 182 fixed to intermediate shaft 180. The thread(s) of a non-self locking enveloping worm 184 are meshed with the teeth of enveloping worm gear 182 and has a rotation axis which lies in a plane that is transverse to the rotational axis of enveloping worm gear 182. Worm 184 is fixed to a power take-off output shaft 186 which is drivingly connected to a rear propshaft 188 which drives a rear differential unit 190 of rear axle assembly 191.

It should be understood that enveloping worm 184 and enveloping worm gear 182 could be transposed such that worm gear 182 is provided on output shaft 186 and worm 184 is provided on intermediate shaft 180 without departing from the spirit and scope of the present invention.

According to the present invention, worm gearset 181 comprised of worm 184 and worm gear 182 is preferably of the double enveloping type described above wherein the ratio of the number of teeth on worm gear 182 to the number of threads on worm 184 is low. Preferably, worm gear 182 has fewer than twenty-four teeth. It is contemplated that any of the worm gearset transmissions shown in FIGS. 1–3, 9–11, 13, 17, 19–20 and 23 could be used with PTU 148. It has been known in the prior art to provide a transfer unit having an intermediate shaft which is provided with a bevel gear which mates with a corresponding bevel gear of an output shaft. However, the worm/worm gear transmission of the present invention provides a quieter and more compact unit which is capable of transmitting increased torque loads to the rear output shaft.

Several embodiments of the present invention have been disclosed. A worker of ordinary skill in the art would recognize that certain modifications would come within the scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power take-off unit connecting an output of a transaxle to a rear driveline, comprising:

a transfer shaft driven by the transaxle output;

an intermediate shaft;

a transfer gearset including a first gear fixed to said transfer shaft which is meshed with a second gear fixed to said intermediate shaft;

an output shaft driving the rear driveline; and a worm gearset having one of an enveloping worm and an enveloping worm gear fixed to said intermediate shaft and the other of said worm and worm gear fixed to said output shaft, wherein said enveloping worm has at least one screw thread engaged by at least one tooth of said enveloping worm gear, said worm gear having less than twelve teeth.

* * * * *